United States Patent
Brissette et al.

(10) Patent No.: US 10,784,681 B2
(45) Date of Patent: Sep. 22, 2020

(54) CONTROL ARCHITECTURES FOR POWER DISTRIBUTION NETWORKS WITH DISTRIBUTED ENERGY RESOURCE

(71) Applicant: ABB Power Grids Switzerland AG, Baden (SE)

(72) Inventors: Alexander Brissette, Raleigh, NC (US); Joseph A. Carr, Raleigh, NC (US); Zhenyuan Wang, Apex, NC (US)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 16/274,314

(22) Filed: Feb. 13, 2019

(65) Prior Publication Data

US 2020/0259329 A1     Aug. 13, 2020

(51) Int. Cl.
| | |
|---|---|
| *H02J 3/18* | (2006.01) |
| *G05B 17/02* | (2006.01) |
| *G06Q 50/06* | (2012.01) |
| *G06Q 30/02* | (2012.01) |

(52) U.S. Cl.
CPC .............. *H02J 3/18* (2013.01); *G05B 17/02* (2013.01); *G06Q 30/0283* (2013.01); *G06Q 50/06* (2013.01); *H02J 2203/20* (2020.01)

(58) Field of Classification Search
None
See application file for complete search history.

(56) References Cited

U.S. PATENT DOCUMENTS

| | | | |
|---|---|---|---|
| 9,087,359 B2 * | 7/2015 | Chassin | G06Q 30/08 |
| 9,129,337 B2 * | 9/2015 | Chassin | G06Q 30/08 |
| 2009/0228324 A1 | 9/2009 | Ambrosio et al. | |

(Continued)

OTHER PUBLICATIONS

S. Hanif, T. Massier, H. B. Gooi, T. Hamacher and T. Reindl, "Cost Optimal Integration of Flexible Buildings in Congested Distribution Grids," in IEEE Transactions on Power Systems, vol. 32, No. 3, pp. 2254-2266, May 3, 2017.

(Continued)

*Primary Examiner* — Ryan A Jarrett
(74) *Attorney, Agent, or Firm* — Slater Matsil, LLP

(57) ABSTRACT

Architectures, apparatuses, methods, systems, and techniques for controlling electrical power distribution network are disclosed. Distributed, hierarchical controls including layered locational energy service control variables may be utilized to determine and control the provision of energy services, including real power, reactive power (VAR), and capacity reserves, by DERs in a distribution network. In a first ex-ante iteration a simulation may be performed to calculate a set of subnetwork-specific control variables based on subnetwork locational energy service prices and a plurality of sets of DER-specific control variables based on DER locational energy service prices. In a second ex-ante iteration a set of actual subnetwork-specific control variables based on subnetwork locational energy service prices and a plurality of sets of actual DER-specific control variables based on DER locational energy service prices. Provision of energy services by DERs in a distribution network occur in response to the determined control variables.

20 Claims, 4 Drawing Sheets

(56) References Cited

U.S. PATENT DOCUMENTS

2013/0338843 A1* 12/2013 Iravani ............... H02J 4/00 700/295
2015/0261892 A1* 9/2015 Bozchalui ............ H02J 3/32 703/1
2019/0020220 A1* 1/2019 Lian ................... G06Q 50/06

OTHER PUBLICATIONS

Z. Yuan, M. R. Hesamzadeh and D. Biggar, "Distribution Locational Marginal Pricing by Convexified ACOPF and Hierarchical Dispatch," in IEEE Transactions on Smart Grid. Jan. 1, 2016.

F. Rahimi, A. Ipakchi, "Using a Transactive Energy Framework," in IEEE Electrification Mag, pp. 23-29, Dec. 5, 2016.

P. Sotkiewicz et al., "Nodal Pricing for Distribution Networks: Efficient Pricing for Efficiency Enhancing DG" in IEEE Transactions on Power Systems, vol. 21, No. 2, pp. 1013-1014, May 2, 2006.

S. Huang et al., "Distribution Locational Marginal Pricing Through Quadratic Programming for Congestion Management in Distribution Networks," in IEEE Transactions on Power Systems, vol. 30 No. 4, pp. 2170-2178, Jul. 4, 2015.

R. Li et al, "Distribution Locational Marginal Pricing for Optimal Electric Vehicle Charging Management," in IEEE Transactions on Power Systems, vol. 29, No. 1, pp. 203-211, Jan. 1, 2014.

Z. Yuan et al., "Distribution Locational Marginal Pricing by Convexified ACOPF and Hierarchical Dispatch", IEEE Transaction on Smart Grid, vol. 9, No. 4, Jul. 4, 2018.

S. Hanif et al., "Cost Optimal Integration of Flexible Buildings in Congested Distribution Grids", IEEE Transaction on Power Systems, vol. 32, No. 3, May 3, 2017.

Na Li, "A Market Mechanism for Electric Distribution Networks", IEEE 54th Annual Conference on Decision and Control, Dec. 15, 2015.

Ibrahim Alsaleh et al., "Distribution Locational Marginal Pricing (DLMP) for Multiphrase Systems", Conference: North American Power Symposium, Sep. 1, 2018.

Jun Hao, "Locational Marginal Pricing at the Power Distribution Level," University of Denver, Jan. 1, 2015.

The GridWise Architecture Council, "GridWise Transactive Energy Framework" Transactive Energy Framework, Jan. 1, 2015.

F. Rahimi et al., "Distribution Management System for the Grid of the Future," in IEEE Electrification Mag, pp. 84-94, May 30, 2018.

* cited by examiner

CONTROL ARCHITECTURES FOR POWER DISTRIBUTION NETWORKS WITH DISTRIBUTED ENERGY RESOURCE

BACKGROUND

The present application relates to control architectures for electrical power distribution networks (sometimes referred to herein as distribution networks) with distributed energy resources (DERs) and related apparatuses, methods, systems, and techniques. Electrical power transmission grid control systems have utilized locational pricing, such as locational marginal pricing, in connection with controlling operation of electrical power transmission grids. The proliferation of DERs in distribution networks offers a similar potential and some proposals have been made to extend similar controls systems to distribution networks. In practice, however, such proposals have encountered and been frustrated by a number of technological problems.

Determining locational pricing in distribution networks including DERs is very difficult because of their complexity and temporal variability. Many proposed control solutions are so computationally intensive as to be impracticable. Furthermore, even with the benefit of extraordinary computing resources, control systems for distribution networks including DERs face multiple unmet technical challenges. For example, distribution network operators may lack control authority over the operation of DERs in the distribution system making true dispatch or demand-response control infeasible. This means that even a perfectly calculated solution cannot in practice be reliably implemented. Additionally, DERs in a distribution network may be controlled by aggregators who control multiple DERs. Furthermore, aggregator-controlled DERs may be located in different locations throughout the distribution network and the constituent DERs of an aggregator will vary over time. Even the fastest, most accurate and most precise computations of locational pricing as a control variable may result in undesirable network operation such as phase imbalance, line congestion, over-voltage conditions, and other operating constraint excursions. There remains a substantial need for the unique architectures, apparatuses, methods, systems, and techniques disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

Unique architectures, apparatuses, methods, systems, and techniques for controlling electrical power distribution network (sometimes referred to herein as a distribution network) are disclosed. In certain embodiments, a distributed, hierarchical control architecture including layered locational energy service control variables is utilized to determine and control the provision of energy services (e.g., real power, reactive power (VAR), and capacity reserves) by DERs in a distribution network. In exemplary embodiments, the energy service control variables may be denominated in terms of price or cost of a given energy service and may be referred to as energy service price control variable(s). Denomination of an energy service control variable in terms of price or cost is convenient and simplifies conducting related economic activity. It shall be appreciated, however, that denomination of the control variable in terms of price or cost is essentially arbitrary and does not alter the fact that the energy service control variables are technical control features used controlling the operation of particular systems and devices such as illustrated by the examples disclosed herein. Further embodiments, forms, objects, features, advantages, aspects, and benefits shall be apparent from the following description and drawings.

DETAILED DESCRIPTION OF ILLUSTRATIVE EMBODIMENTS

Figure 1:
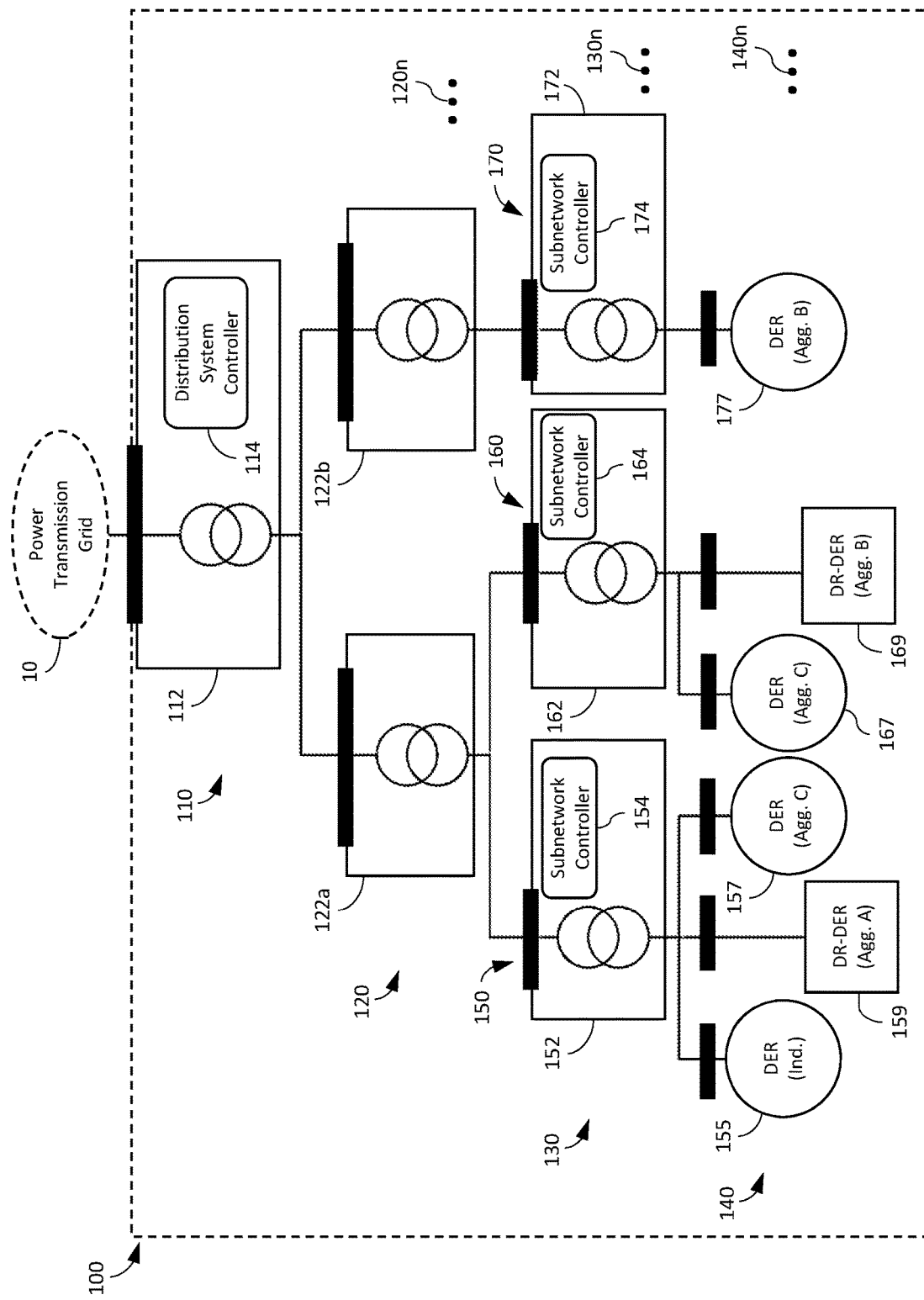
FIGS. 1 and 2 are schematic diagrams illustrating certain physical and logical aspects of an exemplary electrical power distribution network.
Figure 2:
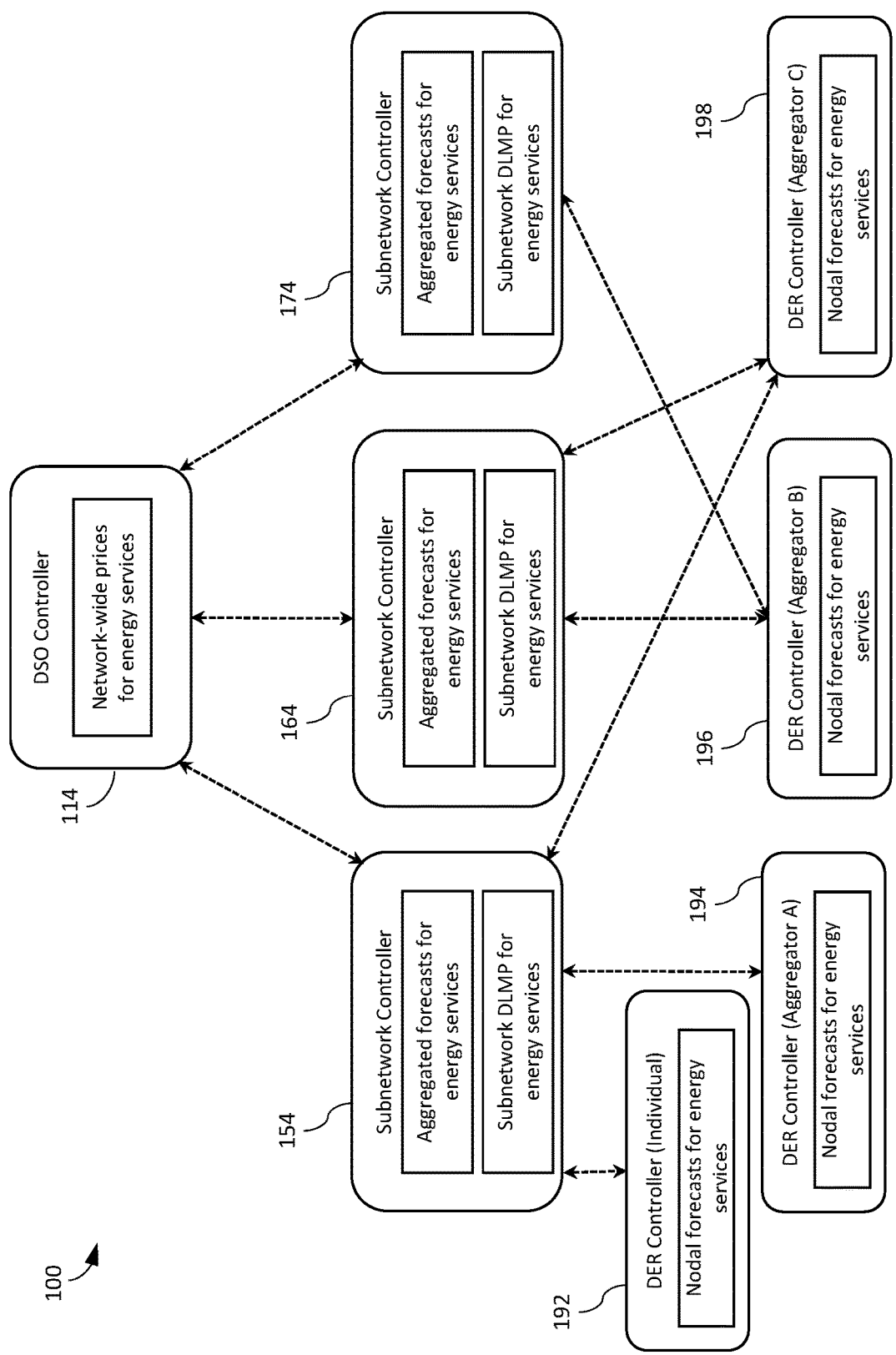

With reference to FIGS. 1 and 2, there are illustrated certain physical and logical aspects of an exemplary electrical power distribution network 100 (sometimes referred to herein as distribution network 100) according to one exemplary embodiment. Distribution network 100 includes a hierarchy of control layers including a top layer 110, an intermediate layer 120, a middle layer 130 and a bottom layer 140 each of which comprises certain components configured to perform certain operations as further described herein below.

Top layer 110 of distribution network 100 includes a substation 112 (sometimes referred to as a transmission or HV/HV substation) which is configured to operatively couple distribution network 100 with electrical power transmission network 10 and to provide bidirectional power conversion between electrical power transmission network 10 and the distribution network 100. In certain embodiments substation 112 is configured and equipped to provide high voltage/high voltage (HV/HV) power conversion although other power level conversions are also contemplated. Substation 112 includes a distribution system controller 114 which is configured to control the operation of substation 112 and to bi-directionally communicate with other controllers in distribution network 100. Distribution system controller 114 is typically the sole controller provided at top layer 110 of distribution network 100.

Intermediate layer 120 of distribution network 100 includes substations 122a, 122b (sometimes referred to as sub-transmission substations or HV/MV substations) which are configured to operatively couple top layer 110 with middle layer 130 and to provide bidirectional power conversion therebetween. In certain embodiments substations 122a, 122b are configured and equipped to provide high voltage/medium voltage (HV/MV) power conversion although other power level conversions are also contemplated. Substations 122a, 122b may include respective controllers which control their respective operation and, while nor required by the present example, may also be configured to bi-directionally communicate with other controllers in distribution network 100. As denoted by ellipsis 120n, intermediate layer 120 of distribution network 100 may include a greater or lesser number of substations at intermediate layer 120. In some embodiments middle layer 120 and may be omitted. Other embodiments may include additional layers including respective substations between layer 120 and layer 110 and/or between layer 120 and layer 130.

Middle layer 130 of distribution network 100 includes distribution substations 152, 162, 172 (sometimes referred to as MV/MV substations) which are configured to operatively couple intermediate layer 120 with bottom layer 140 and to provide bidirectional power conversion therebetween. In certain embodiments substation substations 152, 162, 172 are configured and equipped to provide medium voltage/ medium voltage (MV/MV) power conversion although other power level conversions are also contemplated. Substations 152, 162, 172 include respective subnetwork controllers 154, 164, 174 which control their respective operation and are configured to bi-directionally communicate with other controllers in distribution network 100. As denoted by ellipsis 130n, distribution network 100 may include may include a greater or lesser number of substations at middle layer 130.

Bottom layer 140 includes a distributed energy resources (DERs) 155, 157, 167, 177 which are operatively coupled with and configured to receive power from or provide power to certain substations 152, 162, 172 of middle layer 130. DERs 155, 157, 167, 177 may comprise, for example, engine powered generators, solar power systems, wind power systems, small hydropower systems, biomass power systems, biogas power systems, geothermal power systems, energy storage systems (ESS) such as batteries or flywheels, energy use or load curtailment systems or combinations thereof. Bottom layer 140 also includes demand response DERs (DR-DERs) 159, 169 which are operatively coupled with and configured to receive power from or provide power to certain substations 152, 162, 172 of middle layer 130. DR-DERs 159, 169 may comprise the, or may consist only of demand response energy use or load curtailment systems. One or more of DERs 155, 157, 167, 177 may be autonomously controlled by its respective DER controller such as the higher layer control elements lack the ability to control or dictate operation of the DER. In contrast, DR-DERs, are controlled by their respective DER controller which subject to which is sometimes referred to as demand response or dispatch operation. As denoted by ellipsis 140n, distribution network 100 may include may include a greater or lesser number of DERs and/or DR loads at middle layer 130.

Middle layer 130 and bottom layer 140 of distribution include multiple distinct subnetworks 150, 160 170. In the illustrated embodiment, subnetwork 150 comprises distribution substation 152, DERs 155, 157 and DR-DER 159, subnetwork 160 comprises distribution substation 162, DER 167 and DR-DER 169, and subnetwork 170 comprises distribution substation 162 and DER 177. It shall be appreciated that this subnetwork configuration is a simple example and that subnetworks which many more DERs, DR-DERs and/or additional loads are contemplated by the present disclosure.

DERs 155, 157, 167, 177 and DR-DERs 159, 169 are controlled by respective DER controllers which may be controllers dedicated to an individual DERs or aggregator controllers for multiple DERs. For example, DER 155 is controlled by DER controller 192 which is dedicated to that purpose. Similarly, DR-DER 159 is controlled by DER controller 194 which is dedicated to that purpose. In contrast, DER controller 196 controls DER 177 and DR-DER 169 which are in separate subnetworks. Similarly, DER controller 198 controls DER 157 and DER 176 which are also in separate subnetworks.

It shall be appreciated that distribution network 100 is one example of a distribution network including a distribution system controller at a transmission substation which couples the electrical power distribution network to an electrical power transmission grid. Distribution network is also one example of a distribution network including a plurality of subnetwork controllers provided at a respective plurality of distribution substations serviced by the transmission substation and servicing a respective plurality of subnetworks of the distribution network. Additionally, in distribution network 100 each of the subnetwork controllers is configured to bi-directionally communicate with the distribution system controller and to bi-directionally communicate with a respective plurality of distributed energy resource controllers (DER controllers). Furthermore, each of the DER controllers is configured to control operation of one or more of the plurality of DERs, and one or more of the DER controllers is configured to control operation of two or more DERs which are located in different subnetworks of the distribution network.

It shall be further appreciated that the controllers disclosed herein including, such as distribution system controller 114, subnetwork controllers 154, 164, 174, and DER controllers 192, 194, 196, 198 may be provided in a number of forms and configurations. For example, the disclosed controllers may comprise of digital circuitry, analog circuitry, or combinations of both of these types. The processing circuitry of the disclosed controllers may be programmable, an integrated state machine, or a hybrid combination thereof. The disclosed controllers may include processing circuitry including or more arithmetic logic units, central processing units, or processor cores, as well as one or more memories, communication interfaces, sensors, and other analog or digital circuitry operatively coupled with the processing circuitry. In some forms, the disclosed controllers may be microprocessor-based or microcontroller-based computing devices. Additionally, the disclosed controllers may be provided as single locations in distribution network 100. In such forms, the disclosed controllers may comprise a single microprocessor-based or microcontroller-based computing device or multiple such computing devices. The disclosed controllers may also be distributed across multiple locations In such forms, components of the disclosed controllers present at a given location of distribution network 100 may comprise a single device or multiple devices. It shall be further appreciated only a portion of the disclosed controllers need physically reside at a given location of distribution network 100 in order to be considered present at that location. Thus, for example, a subnetwork controller may include multiple controller components only some of which are present at a given distribution sub station.

Figure 3:
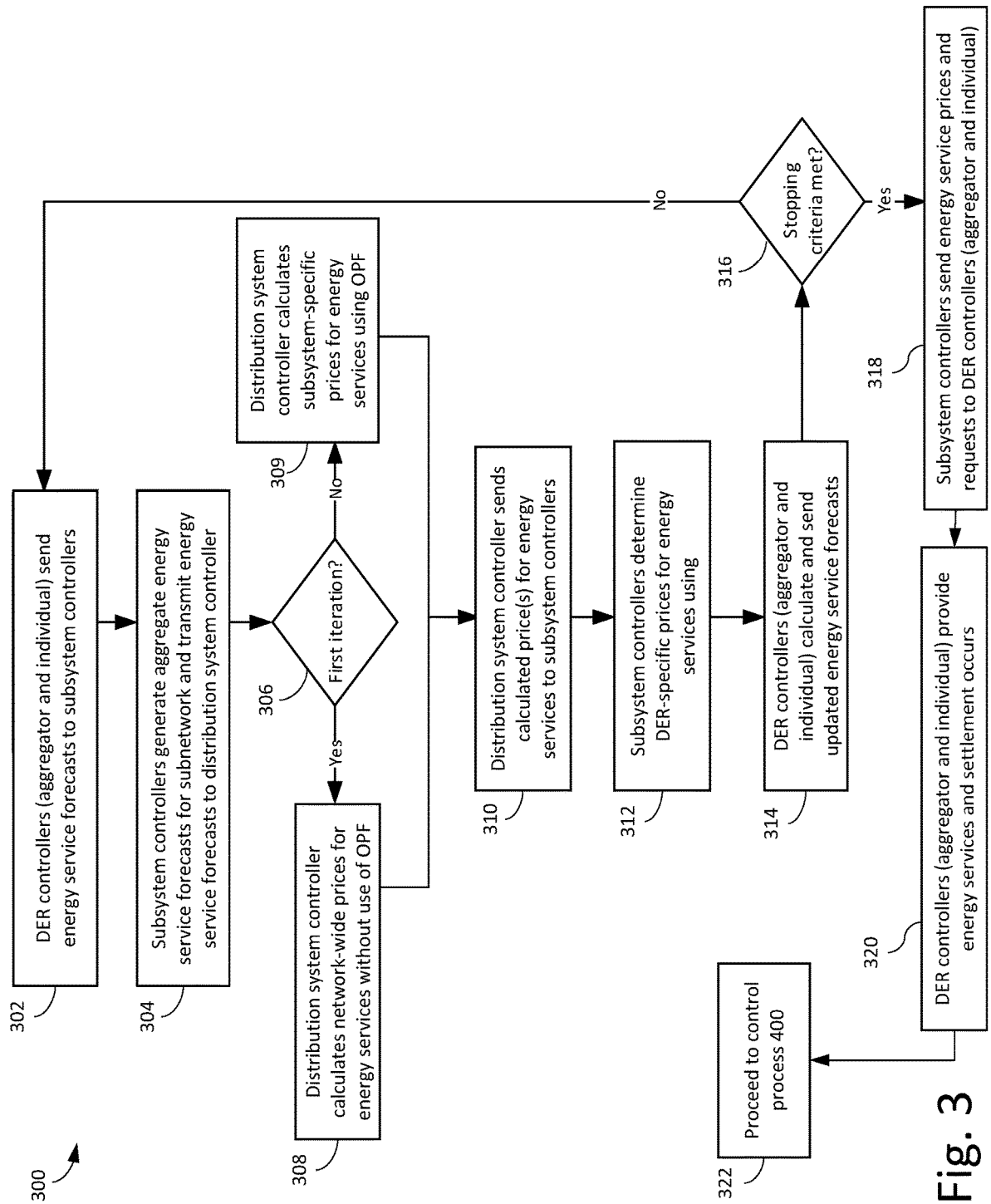
FIG. 3 is a flowchart illustrating certain aspects of an exemplary ex-ante energy service control process for an electrical power distribution network.

With reference to FIG. 3, there are illustrated certain aspects of an exemplary control process 300 for an electrical power distribution network. In one aspect, control process 300 provides one example of a distributed, hierarchical control process for a distribution network which utilizes layered locational pricing as a lever or control variable for controlling operation of a distribution network, such as distribution network 100. In another aspect, control process 300 illustrates exemplary operations in an ex-ante energy service price control variable calculation utilized in controlling operation of a distribution network, such as distribution network 100. In describing control process 300 reference is occasionally made to certain elements of distribution network 100. It shall nevertheless be appreciated both that the element of distribution network 100 may be utilized even where not specifically referenced, and that control process may be implemented in and performed by a variety of other electrical power distribution networks and components.

Control process 300 may begin with operation 302 in which a plurality of DER controllers (including both controllers for individual DERs and aggregator controllers for multiple DERs) determine DER controller-specific energy service forecasts including energy services prices and transmit the energy service forecasts to one or more respective subnetwork network controllers. In the context of distribution network 100 these operations may involve DER controllers 192, 194, 196, 198 and/or other DER controllers as well as subnetwork controllers 136*a*, 136*b*, 136*c* and/or other subnetwork controllers. The energy service forecast includes initial bid price values for one or more energy services which denote the price at which the DER or aggregator generating the forecast will provide the one or more energy service at a future time or over a future time period. In certain forms, the one or more energy services include one or more of real power, reactive power (VAR), and reserve power capacity. In certain forms, the one or more energy services include real power, reactive power (VAR), and reserve power capacity. The DER controller forecasts may be based on autonomous decisions of each DER controller as to how to participate in various energy service operations. The energy service forecasts may also include linearized cost functions indicating the variation of the energy service forecast as a function of price. In the first iteration of control process 300, operation 302 may determine and transmit initial energy service forecasts including energy services prices. In the second and any subsequent iterations of control process 300, operation 302 may transmit updated energy service forecasts including energy services prices which may be determined by operation 302 or by another operation such as operation 314 described below.

Control process 300 proceeds from operation 302 to operation 304 in which each of a plurality of subnetwork controllers determines subnetwork controller-specific aggregate energy service forecasts including energy services prices for their respective subnetworks and transmits their respective aggregate energy service forecasts to a distribution network controller. Each of a plurality of subnetwork controller determines an aggregate energy service forecast including an aggregate energy service price for its entire respective subnetwork using the energy service forecasts received from their DERs in their respective subnetwork and a model of the net electrical behavior of its respective subnetwork. The subnetwork models preferably recognize that not all DERs and loads in a given subnetwork can be controlled and that some DERs may autonomously choose not to participate in any energy service operation or in a given energy service operation. Thus, the model may distinguish between participating DERs and non-participating DERs or uncontrolled loads and generators in the subnetwork. The model may also account for the historical behavior of participating DERs in the subnetwork to assess the likelihood that they will participate in a given energy service operation. The aggregate energy service forecast generated by each subnetwork controller may also include an aggregate cost function based on the cost functions provided by its constituent DER controllers into a single linear function for the whole subnetwork. Once calculated, each subnetwork controller sends its aggregated energy service forecasts to a distribution system controller.

Control process 300 proceeds from operation 304 to conditions 306 which evaluates whether control process 300 is in its first iteration for a given set of control operations (e.g., a particular energy service provision event and/or a particular control period, time or window). If conditional 306 evaluates as true, control process 300 proceeds to operation 308 in which the distribution network controller determines and transmits to each of the subnetwork controllers an initial network-wide energy service price determined in response to the initial aggregate energy service prices and without the use of a power flow optimization or an optimized power flow. Thus, operation 308 does not consider or adjust for power flow conditions such as phase imbalance, network congestion, over-voltage conditions or other operating constraint excursions for the distribution network.

If conditional 306 evaluates as false, control process 300 proceeds to operation 309 in which the distribution network controller determines and transmits to each of the subnetwork controllers respective subnetwork controller-specific energy service prices determined in response to the updated aggregate energy service prices and a power flow optimization or optimized power flow for the distribution network. Thus, operation 309 considers and adjusts for power flow conditions such as phase imbalance, network congestion, over-voltage conditions or other operating constraint excursions for the distribution network.

The distribution network controller may perform a power flow optimization to calculate an optimized power flow (OPF) using the forecasts and cost functions from which it derives substation controller-specific energy service prices. The power flow optimization and OPF may utilize a network model encompasses and extends only from top layer 110 to middle layer 130 or excludes elements of bottom layer 140. This mitigates the introduction of model and computational complexities that would otherwise be introduced by elements below middle layer 130.

From operation 308 or 309, control process 300 proceeds to operation 310 in which, depending on the iteration state of control process 300, the distribution network controller transmits to each of a plurality of subnetwork controllers either an initial network-wide energy service price such as determined by operation 308 or a subnetwork controller-specific energy service prices such as determined by operation 309. It shall be appreciated that control process 300 is one example of an iterative control process for a distribution network including DERs. The first iteration of control process 300 in a given set of control operations may be considered a simulation or initialization of an energy service price control variable as the results of its calculations will not serve directly as the ultimate control variable for controlling provision of energy services or settlement of related transactions. On the other hand, the second and any subsequent iterations of control process 300 in a given set of control operations may be considered a determination of an energy service price control variable as the results of its calculations may serve directly as the ultimate control variable for generating energy service requests and controlling provision of energy services and settlement of related transactions. Furthermore, reference to a calculation of energy service price control variable shall be understood to encompass aspects of both the first iteration and subsequent iterations of control process 300.

Control process 300 proceeds from operation 310 to operation 312 in which, depending on the iteration state of control process 300, the subnetwork controllers determine and transmit to their respective DER controllers either initial DER controller-specific energy service prices determined in response to the initial network-wide energy service price (e.g., in the first iteration of control process 300) or updated DER controller-specific energy service prices and requests determined in response to the respective subnetwork controller-specific energy service prices (e.g., in the second and any subsequent iteration of control process 300).

Control process 300 proceeds from operation 312 to operation 314 in which the plurality of DER controllers determine updated energy service forecasts including updated energy services prices and transmit the updated energy service forecasts to one or more respective subnetwork network controllers.

Control process 300 proceeds from operation 314 to conditional 316 which evaluates whether one or more stopping criteria has been met. In certain embodiments the stopping criteria may evaluate a limit on the total number of iterations or a limit of control process 300, for example, two iterations, three iterations or another number of iterations predetermined to allow control process 300 to complete its iterations in a time frame needed for control of the distribution network. In certain embodiments, the stopping criteria may evaluate a limit on the total iteration time of control process 300 to allow control process 300 to complete its iterations in a time frame needed for control of the distribution network. In certain embodiments, the stopping criteria may evaluate both a convergence criterion for control process 300 and a limit on the total number of iterations or total iteration time of control process 300. The convergence criterion may be, for example, a threshold for the difference or variation in the updated energy service forecasts from the DER controllers and their prior forecast iteration (either the initial forecast or a prior updated forecast).

If conditional 316 evaluates as false, control process 300 proceeds to operation 302 and from there may proceed as described above. On the other hand, if conditional 316 evaluates as true, control process 300 proceeds to operation 318 in which the subnetwork controllers send DER controller-specific energy service prices and energy service requests to the DER controllers in their respective subnetworks. Control process 300 then proceeds to operation 320 in which in response to transmission of the DER controller-specific energy service prices and energy service requests, the distribution substations receive at least a portion of the energy services requested of the DER controllers and the transmission substation ultimately receives at least a portion of the energy services requested of the subnetwork controllers. Control process 300 then proceeds to operation 322 which initiates control process 400.

Figure 4:
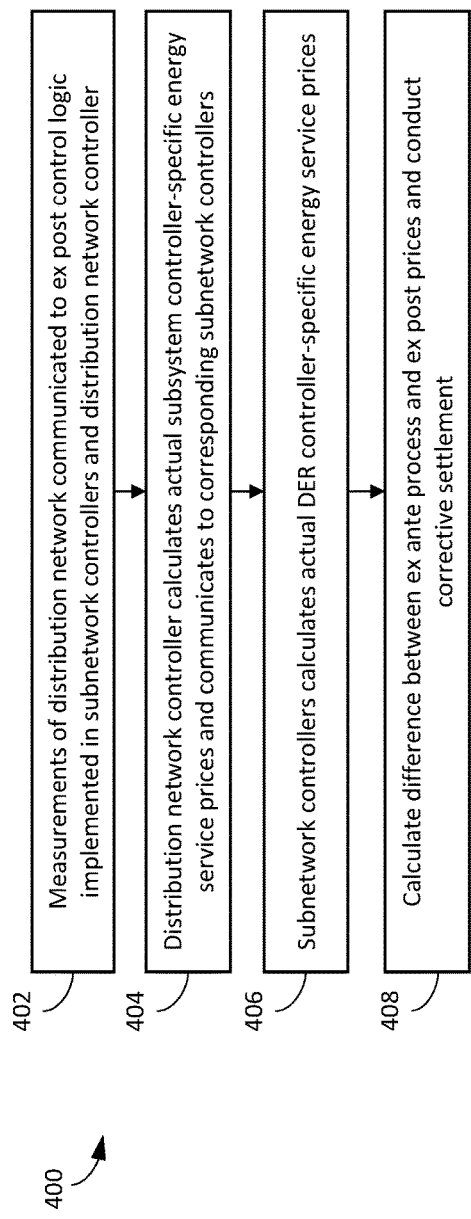
FIG. 4 is a flowchart illustrating certain aspects of an exemplary ex-post energy service control process for an electrical power distribution network.

With reference to FIG. 4, there are illustrated certain aspects of an exemplary ex-post control process 400 for an electrical power distribution network. It shall be appreciated that ex-post control process 400 is one example of an indirect control mechanism for providing and/or promoting compliance with energy service requests sent by subnetwork controllers to DER controllers. As indicated above, it is contemplated that a distribution network controller and subnetwork controllers may lack direct control authority over the operation of one or multiple DERs in the distribution system making true dispatch or demand-response control infeasible and resulting in undesirable system operating conditions. Ex post control process 400 addresses this technical challenge by providing indirect enforcement or quasi-dispatch control authority. As with control process 300 and the other controls and control aspects disclosed herein, that the denomination of control variables which are used to achieve these technical effects in terms of cost or price is essentially arbitrary and does not alter the fact that the disclosed apparatuses, methods, and systems are technical control system features used controlling the operation of a particular systems and devices.

In a further aspect, ex-post control process 400 illustrates exemplary operations in an ex-post energy service price control variable calculation utilized in controlling operation of a distribution network, such as distribution network 100. In another aspect, ex-post control process 400 illustrates exemplary operations in an ex-post energy service price control variable calculation utilized to mitigate deviations in the response to the DERs of a distribution network to energy service requests determined in and ex-ante energy service price control variable calculation such as the example illustrated by control process 300. In describing ex-post control process 400 reference is occasionally made to certain elements of distribution network 100. It shall nevertheless be appreciated both that the element of distribution network 100 may be utilized even where not specifically referenced, and that control process may be implemented in and performed by a variety of other electrical power distribution networks and components.

Ex-post control process 400 may begin with operation 402 in which actual measurements of a distribution network, such as distribution network 100, are communicated to ex-post control logic implemented in the subnetwork controllers and the distribution network controller. The network measurements communicated to each subnetwork controllers may include real power output, reactive power output, load, real power consumption, reactive power consumption, bus voltages, and other electrical characteristics of the DERs present in its respective subnetwork. The measurements may be received from meters associated with the DERs or may be calculated by state estimation logic provided in one or more controllers of each respective subnetwork, such as the subnetwork controllers or other controllers.

Ex-post control process 400 proceeds from operation 402 to operation 404 in which the distribution network controller calculates a new set of actual subnetwork controller-specific energy service prices that reflect the actual conditions of the subnetwork during the control interval and communicates the actual subnetwork controller-specific energy service prices to each corresponding subnetwork controller. The distribution substations may be treated as aggregate loads for the purpose of this calculation. Subnetworks that back-feed power through the substation may be considered negative loads.

Ex-post control process 400 proceeds from operation 404 to operation 406 in which each subnetwork controller calculates a new set of actual DER controller-specific energy service prices that reflect the actual conditions of the DER during the control interval. For example, if a DER demands more power than anticipated causing an undervoltage condition, its updated controller-specific energy service price will reflect the impact on the network. This calculation by the subnetwork controllers is based on the actual subnetwork controller-specific energy service prices determined and communicated by the distribution network controller.

Ex-post control process 400 proceeds from operation 406 to operation 408 in which the difference between the DER-specific ex-ante energy service prices and the corresponding DER-specific ex post energy service prices are calculated and a corrective settlement is conducted.

In contrast to ex-ante control process 300, ex-post control process 400 does not require iterations between the layers of the hierarchy. Instead, a single top to bottom iteration may be performed. Alternatively, the distribution system controller may be structured to perform actual energy service price calculations for the entire distribution network, including all subnetworks and all DERs. The disclosed control architecture makes this feasible because DER energy service values are fixed as measured operating points. Thus, the ex-post calculation does not pose a complex optimization problem as would be found in the ex-ante control process.

Figure 5:
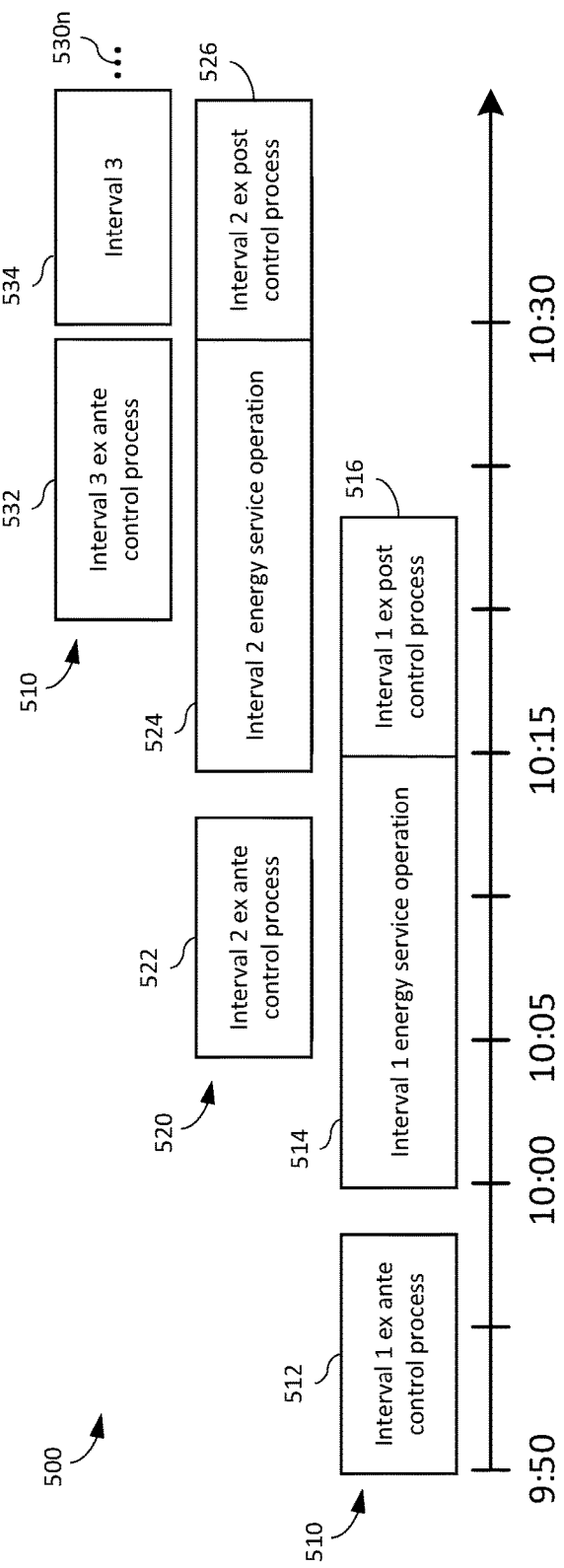
FIG. 5 is a schematic diagram illustrating the occurrence of multiple ex-ante energy service control process and ex post energy service control process over time.

With reference to FIG. 5, there is illustrated a timeline 500 depicting the occurrence of multiple energy service control process over multiple interleaved control intervals 510, 520, 530. Each control interval 510, 520, 530 includes three operations: an ex-ante control process, energy service operation involving actual energy flow, and an ex-post settlement control process. Thus, control interval 510 includes ex-ante control process 512, energy service operation 514, and ex-post settlement control process 516. Control interval 520 includes ex-ante control process 522, energy service operation 524, and ex post settlement control process 526. Control interval 530 includes ex-ante control process 532, energy service operation 534, and an ex-post settlement control process which occurs outside the illustrated portion of timeline 500 as indicated by ellipsis 530n which further indicates the potential presence of further interleaved control intervals which are not illustrated. Ex-ante control processes 512, 522, 532 may utilize one or more aspects of process 300 described above. Ex-post settlement control processes 534, 534, 534 may utilize one or more aspects of process 400 described above.

The processes of control intervals 510, 520, 530 apply to discrete but interleaved time intervals. As, illustrated, for a given interval of interest, the ex-ante step occurs before the energy service operation of the interval starts. In this step, energy service prices are calculated based on forecasts of energy service capacity and demand, and the market for services is settled based on these prices and commitments by all participants. Next, the energy service process interval of interest begins, and actual energy services are generated and used. Finally, the ex-post step occurs after the interval of interest ends. In the ex-post step, a new set of energy service prices are calculated based on the actual network operation measured during the interval, and market participants may be compensated or penalized at the new prices according to their performance.

In timeline 500 each energy service operation interval is a 15-minute interval. For example, actual flow of energy in energy service operation 514 occurs from 10:00 to 10:15. Prior to this, the ex-ante control process 512 is performed. In principle control process 512 may be performed at any time before energy service operation 514 occurs but is preferably perform sufficiently close to the energy service operation 514 that the forecasts are accurate, but sufficiently early to allow enough time for ex-ante control process 512 to complete. The amount of time to perform the settlement may vary with each interval. Once energy service operation 514 is completed, the ex-post settlement is processed using measurements taken during Interval 1. While timeline 500 shows the ex-post step taking about 5 minutes, in practice it may be completed more quickly, as it does not rely on iterations between all layers. During the course of control interval 510, the ex-ante control process 522 of control interval 520 is performed in advance of energy service operation 524 which occurs immediately following energy service operation 512, from 10:15 to 10:30. In practice, the interval demarcations are invisible to the electrical network itself. The interleaved nature of the control processes allows power to flows continuously.

A number of non-limiting exemplary embodiments shall now be further described. A first exemplary embodiment is method for controlling operation of an electrical power distribution network (distribution network) including a plurality of distributed energy resources (DERs) comprising: providing a distribution system controller at a transmission substation which couples the electrical power distribution network to an electrical power transmission grid; providing a plurality of subsystem controllers at a respective plurality of distribution substations serviced by the transmission substation and servicing a respective plurality of subnetworks of the distribution network, each of the subsystem controllers configured to bi-directionally communicate with the distribution system controller and to bi-directionally communicate with a respective plurality of distributed energy resource controllers (DER controllers), each of the DER controllers configured to control operation of one or more of the plurality of DERs, one or more of the DER controllers being configured to control operation of two or more DERs which are located in different subnetworks of the distribution network; in a first control process iteration performing an ex-ante energy service control variable simulation in which (a) the subnetwork controllers determine and transmit to the distribution network controller initial aggregate energy service price forecasts for their respective subnetworks based upon initial DER energy service price forecasts provided by the respective plurality of DER controllers in each subnetwork, (b) the distribution network controller determines and transmits to each of the subnetwork controllers an initial network-wide energy service price determined in response to the initial aggregate energy service price forecasts and without use of a power flow optimization, and (c) the subnetwork controllers determine and transmit to their respective DER controllers initial DER controller-specific energy service prices determined in response to the initial network-wide energy service price; in a second control process iteration after the first iteration performing an ex-ante energy service control variable determination and energy service request operation in which (a) the subnetwork controllers determine and transmit to the distribution network controller updated aggregate energy service prices for their respective subnetworks determined based upon updated DER energy service prices provided by the respective plurality of DER controllers in each subnetwork, (b) the distribution network controller determines and transmits to each of the subnetwork controllers respective subnetwork controller-specific energy service prices determined in response to the updated aggregate energy service prices and a power flow optimization for the distribution network, and (c) the subnetwork controllers determine and transmit to their respective DER controllers respective updated DER controller-specific energy service prices and energy service requests determined in response to the respective subnetwork controller-specific energy service prices; and in response to transmission of the DER controller-specific energy service prices and energy service requests, receiving at the distribution substations at least a portion of the energy services requested of the DER controllers and receiving at the transmission substation at least a portion of the energy services requested of the subsystem controllers.

In certain forms, the method of the first exemplary embodiment comprises, at the end of the second control process iteration one or more iteration stopping criteria evaluations are performed including at least an evaluation of a limit of the number of iterations or the total time of iteration. In certain forms, the one or more iteration stopping criteria evaluations include a convergence evaluation of one or more updated DER controller-specific energy service prices. Certain forms comprise performing an ex-post control process after receiving at the transmission substation at least a portion of the energy services requested of the subsystem controllers. In certain forms, the ex-post control process comprises operating the distribution network controller to compute a set of actual substation-specific energy service prices in response to actual measurements of the energy services provided by the distribution substations under control of the subsystem controllers. In certain forms, the ex-post control process comprises operating the substation controllers to compute a plurality of sets of actual DER-specific energy service prices in response to actual measurements of the energy services provided by the DERs under control of the DER controllers and the respective actual substation-specific energy service prices. In certain forms, the initial DER energy service price forecasts include respective DER energy service prices and corresponding DER linearized cost functions indicating the variation of the respective DER energy service forecast as a function of price, and the initial aggregate energy service price forecasts include an energy service price and a corresponding aggregate linearized cost function indicating the variation of the aggregate energy service forecast as a function of price. In certain forms, the ex-ante energy service control variables include a real power price, a reactive power price, and a reserve capacity price. In certain forms, the power flow optimization for the distribution network is limited to an optimization of power flow in layers of the distribution network between and including the transmission substation and the plurality of distribution substations. In certain forms, the power flow optimization for the distribution network excludes any optimization of portions of the distribution network between distribution substations and the DERs.

A second exemplary embodiment is a system for controlling operation of an electrical power distribution network (distribution network) including a plurality of distributed energy resources (DERs), the system comprising: a distribution system controller operatively coupled with a transmission substation which couples the electrical power distribution network to an electrical power transmission grid; a plurality of subsystem controllers operatively coupled with a respective plurality of distribution substations serviced by the transmission substation and servicing a respective plurality of subnetworks of the distribution network, each of the subsystem controllers configured to bi-directionally communicate with the distribution system controller and to bi-directionally communicate with a respective plurality of distributed energy resource controllers (DER controllers), each of the DER controllers configured to control operation of one or more of the plurality of DERs, one or more of the DER controllers being configured to control operation of two or more DERs which are located in different subnetworks of the distribution network; the distribution system controller and the plurality of subsystem controllers being configured to perform an ex-ante energy service control variable simulation in which (a) the subnetwork controllers determine and transmit to the distribution network controller initial aggregate energy service price forecasts for their respective subnetworks based upon initial DER energy service price forecasts provided by the respective plurality of DER controllers in each subnetwork, (b) the distribution network controller determines and transmits to each of the subnetwork controllers an initial network-wide energy service price determined in response to the initial aggregate energy service price forecasts and without use of a power flow optimization, and (c) the subnetwork controllers determine and transmit to their respective DER controllers initial DER controller-specific energy service prices determined in response to the initial network-wide energy service price; the distribution system controller and the plurality of subsystem controllers being configured to perform an ex-ante energy service control variable determination and energy service request operation in which (a) the subnetwork controllers determine and transmit to the distribution network controller updated aggregate energy service prices for their respective subnetworks determined based upon updated DER energy service prices provided by the respective plurality of DER controllers in each subnetwork, (b) the distribution network controller determines and transmits to each of the subnetwork controllers respective subnetwork controller-specific energy service prices determined in response to the updated aggregate energy service prices and a power flow optimization for the distribution network, and (c) the subnetwork controllers determine and transmit to their respective DER controllers respective updated DER controller-specific energy service prices and energy service requests determined in response to the respective subnetwork controller-specific energy service prices; the distribution substations being configured to receive at least a portion of the energy services requested by the DER controllers; and the transmission substation being configured to receive at least a portion of the energy services requested by the subsystem controllers.

In certain forms of the second exemplary embodiment comprises the subnetwork controllers are configured to evaluate one or more iteration stopping criteria including at least an evaluation of a limit of the number of iterations or the total time of iteration. In certain forms, the one or more iteration stopping criteria evaluations include a convergence evaluation of one or more updated DER controller-specific energy service prices. In certain forms, the distribution system controller and the plurality of subsystem controllers are configured to perform an ex-post control process after receiving at the transmission substation at least a portion of the energy services requested of the subsystem controllers. In certain forms, the distribution system controller and the plurality of subsystem controllers are configured to perform the ex post control process comprises by operating the distribution network controller to compute a set of actual substation-specific energy service prices in response to actual measurements of the energy services provided by the distribution substations under control of the subsystem controllers. In certain forms, the distribution system controller and the plurality of subsystem controllers are configured to perform the ex-post control process by operating the substation controllers to compute a plurality of sets of actual DER-specific energy service prices in response to actual measurements of the energy services provided by the DERs under control of the DER controllers and the respective actual substation-specific energy service prices. In certain forms, the initial DER energy service price forecasts include respective DER energy service prices and corresponding DER linearized cost functions indicating the variation of the respective DER energy service forecast as a function of price, and the initial aggregate energy service price forecasts include an energy service price and a corresponding aggregate linearized cost function indicating the variation of the aggregate energy service forecast as a function of price. In certain forms, the ex-ante energy service control variables include one or more prices for real power, reactive power, and reserve capacity. In certain forms, the power flow optimization for the distribution network is limited to an optimization of power flow in layers of the distribution network between and including the transmission substation and the plurality of distribution substations. In certain forms, the power flow optimization for the distribution network excludes any optimization of portions of the distribution network between distribution substations and the DERs.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method for controlling operation of an electrical power distribution network including a plurality of distributed energy resources (DERs), the method comprising:
providing a distribution system controller at a transmission substation which couples the electrical power distribution network to an electrical power transmission grid;
providing a plurality of subnetwork controllers at a respective plurality of distribution substations serviced by the transmission substation and servicing a respective plurality of subnetworks of the distribution network, each of the subnetwork controllers configured to bi-directionally communicate with the distribution system controller and to bi-directionally communicate with a respective plurality of distributed energy resource controllers (DER controllers), each of the DER controllers configured to control operation of one or more of the plurality of DERs, one or more of the DER controllers being configured to control operation of two or more DERs which are located in different subnetworks of the distribution network;
in a first control process iteration, performing an ex-ante energy service control variable simulation in which:
(a) the subnetwork controllers determine and transmit to the distribution system controller initial aggregate energy service price forecasts for their respective subnetworks based upon initial DER energy service price forecasts provided by the respective plurality of DER controllers in each subnetwork,
(b) the distribution system controller determines and transmits to each of the subnetwork controllers an initial network-wide energy service price determined in response to the initial aggregate energy service price forecasts and without use of a power flow optimization for the distribution network, and
(c) the subnetwork controllers determine and transmit to their respective DER controllers initial DER controller-specific energy service prices determined in response to the initial network-wide energy service price;
in a second control process iteration after the first iteration, performing an ex-ante energy service control variable determination and energy service request operation in which:
(a) the subnetwork controllers determine and transmit to the distribution system controller updated aggregate energy service prices for their respective subnetworks determined based upon updated DER energy service prices provided by the respective plurality of DER controllers in each subnetwork,
(b) the distribution system controller determines and transmits to each of the subnetwork controllers respective subnetwork controller-specific energy service prices determined in response to the updated aggregate energy service prices and the power flow optimization for the distribution network, and
(c) the subnetwork controllers determine and transmit to their respective DER controllers respective updated DER controller-specific energy service prices and energy service requests for energy services determined in response to the respective subnetwork controller-specific energy service prices; and
in response to the transmission of the DER controller-specific energy service prices and the energy service requests, receiving at the distribution substations at least a portion of the energy services requested of the DER controllers and receiving at the transmission substation at least a portion of the energy services requested by the subnetwork controllers.

2. The method of claim 1 comprising, at an end of the second control process iteration, performing one or more iteration: stopping criteria evaluations including at least an evaluation of a limit of a number of iterations or a total time of iteration.

3. The method of claim 2 wherein the one or more iteration: stopping criteria evaluations include a convergence evaluation of one or more updated DER controller-specific energy service prices.

4. The method of claim 1 comprising performing an ex-post control process after receiving at the transmission substation the at least the portion of the energy services requested by the subnetwork controllers.

5. The method of claim 4 wherein the ex-post control process comprises operating the distribution system controller to compute a set of actual substation-specific energy service prices in response to actual measurements of the energy services provided by the distribution substations under control of the subnetwork controllers.

6. The method of claim 5 wherein the ex-post control process comprises operating the subnetwork controllers to compute a plurality of sets of actual DER-specific energy service prices in response to actual measurements of the energy services provided by the DERs under control of the DER controllers and the respective actual substation-specific energy service prices.

7. The method of claim 1 wherein the initial DER energy service price forecasts include respective DER energy service prices and corresponding DER linearized cost functions indicating a variation of respective DER energy service forecast as a function of price, and the initial aggregate energy service price forecasts include an energy service price and a corresponding aggregate linearized cost function indicating a variation of an aggregate energy service forecast as a function of price.

8. The method of claim 1 wherein ex-ante energy service control variables include a real power price, a reactive power price, and a reserve capacity price.

9. The method of claim 1 wherein the power flow optimization for the distribution network is limited to an optimization of power flow in layers of the distribution network between and including the transmission substation and the plurality of distribution substations.

10. The method of claim 1 wherein the power flow optimization for the distribution network excludes any optimization of portions of the distribution network between the distribution substations and the DERs.

11. A system for controlling operation of an electrical power distribution network including a plurality of distributed energy resources (DERs), the system comprising:

a distribution system controller operatively coupled with a transmission substation which couples the electrical power distribution network to an electrical power transmission grid;

a plurality of subnetwork controllers operatively coupled with a respective plurality of distribution substations serviced by the transmission substation and servicing a respective plurality of subnetworks of the distribution network, each of the subnetwork controllers configured to bi-directionally communicate with the distribution system controller and to bi-directionally communicate with a respective plurality of distributed energy resource controllers (DER controllers), each of the DER controllers configured to control operation of one or more of the plurality of DERs, one or more of the DER controllers being configured to control operation of two or more DERs which are located in different subnetworks of the distribution network;

the distribution system controller and the plurality of subnetwork controllers being configured to perform an ex-ante energy service control variable simulation in which:
  (a) the subnetwork controllers determine and transmit to a distribution system controller initial aggregate energy service price forecasts for their respective subnetworks based upon initial DER energy service price forecasts provided by the respective plurality of DER controllers in each subnetwork,
  (b) the distribution system controller determines and transmits to each of the subnetwork controllers an initial network-wide energy service price determined in response to the initial aggregate energy service price forecasts and without use of a power flow optimization for the distribution network, and
  (c) the subnetwork controllers determine and transmit to their respective DER controllers initial DER controller-specific energy service prices determined in response to the initial network-wide energy service price;

the distribution system controller and the plurality of subnetwork controllers being configured to perform an ex-ante energy service control variable determination and energy service request operation in which:
  (a) the subnetwork controllers determine and transmit to the distribution system controller updated aggregate energy service prices for their respective subnetworks determined based upon updated DER energy service prices provided by the respective plurality of DER controllers in each subnetwork,
  (b) the distribution system controller determines and transmits to each of the subnetwork controllers respective subnetwork controller-specific energy service prices determined in response to the updated aggregate energy service prices and the power flow optimization for the distribution network, and
  (c) the subnetwork controllers determine and transmit to their respective DER controllers respective updated DER controller-specific energy service prices and energy service requests for energy services determined in response to the respective subnetwork controller-specific energy service prices;

the distribution substations being configured to receive at least a portion of the energy services requested of the DER controllers; and the transmission substation being configured to receive at least a portion of the energy services requested by the subnetwork controllers.

12. The system of claim 11 wherein the subnetwork controllers are configured to evaluate one or more iteration: stopping criteria including at least an evaluation of a limit of a number of iterations or a total time of iteration.

13. The system of claim 12 wherein the one or more iteration: stopping criteria evaluations include a convergence evaluation of one or more updated DER controller-specific energy service prices.

14. The system of claim 11 wherein the distribution system controller and the plurality of subnetwork controllers are configured to perform an ex-post control process after receiving at the transmission substation the at least the portion of the energy services requested by the subnetwork controllers.

15. The system of claim 14 wherein the distribution system controller and the plurality of subnetwork controllers are configured to perform the ex-post control process comprises by operating the distribution system controller to compute a set of actual substation-specific energy service prices in response to actual measurements of the energy services provided by the distribution substations under control of the subnetwork controllers.

16. The system of claim 15 wherein the distribution system controller and the plurality of subnetwork controllers are configured to perform the ex-post control process by operating the subnetwork controllers to compute a plurality of sets of actual DER-specific energy service prices in response to actual measurements of the energy services provided by the DERs under control of the DER controllers and the respective actual substation-specific energy service prices.

17. The system of claim 11 wherein the initial DER energy service price forecasts include respective DER energy service prices and corresponding DER linearized cost functions indicating a variation of a respective DER energy service forecast as a function of price, and the initial aggregate energy service price forecasts include an energy service price and a corresponding aggregate linearized cost function indicating a variation of an aggregate energy service forecast as a function of price.

18. The system of claim 11 wherein ex-ante energy service control variables include one or more prices for real power, reactive power, and reserve capacity.

19. The system of claim 11 wherein the power flow optimization for the distribution network is limited to an optimization of power flow in layers of the distribution network between and including the transmission substation and the plurality of distribution substations.

20. The system of claim 11 wherein the power flow optimization for the distribution network excludes any optimization of portions of the distribution network between the distribution substations and the DERs.

\* \* \* \* \*